(12) United States Patent
Hill (10) Patent No.: US 9,715,549 B1
(45) Date of Patent: Jul. 25, 2017

(54) ADAPTIVE TOPIC MARKER NAVIGATION (71) Applicant: Amazon Technologies, Inc., Reno, NV (US)

(72) Inventor: Peter Frank Hill, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 205 days.

(21) Appl. No.: 14/227,206

(22) Filed: Mar. 27, 2014

(51) Int. Cl.
G06F 17/30 (2006.01)

(52) U.S. Cl.
CPC .. *G06F 17/30867* (2013.01); *G06F 17/30864* (2013.01)

(58) Field of Classification Search
USPC ................................. 707/736, 768
See application file for complete search history.

(56) References Cited

U.S. PATENT DOCUMENTS

| 6,546,393 | B1 | 4/2003 | Khan |
| 6,631,496 | B1 | 10/2003 | Li et al. |
| 7,383,283 | B2 * | 6/2008 | Carrabis ............... A61B 5/164 340/500 |
| 8,539,359 | B2 * | 9/2013 | Rapaport ............... G06Q 10/10 709/217 |
| 8,695,872 | B2 * | 4/2014 | Braunstein ........... G06Q 10/087 235/379 |
| 2002/0002325 | A1 * | 1/2002 | Iliff ....................... G06Q 50/22 600/300 |
| 2002/0174230 | A1 * | 11/2002 | Gudorf ............. G06F 17/30867 709/227 |
| 2008/0010319 | A1 | 1/2008 | Vonarburg et al. |
| 2010/0049620 | A1 * | 2/2010 | Debow ............... G06Q 30/0601 705/26.1 |
| 2010/0095219 | A1 * | 4/2010 | Stachowiak ...... G06F 17/30884 715/745 |
| 2011/0282648 | A1 * | 11/2011 | Sarikaya ............. G06F 17/2818 704/7 |
| 2012/0042263 | A1 * | 2/2012 | Rapaport ...................... 715/753 |

(Continued)

OTHER PUBLICATIONS

U.S. Appl. No. 14/080,095, filed Nov. 14, 2013, Notice of Allowance mailed on Oct. 7, 2016.

(Continued)

*Primary Examiner* — Cam-Linh Nguyen
(74) *Attorney, Agent, or Firm* — Thomas | Horstemeyer, LLP; Michael J. D'Aurelio; Jason M. Perilla (57) ABSTRACT Aspects of adaptive topic marker navigation are described. According to one feature, an adaptive topic is established and associated with a marker. The adaptive topic may be initially established based on a user's history of browsing activity. Over time, a change in status associated with the adaptive topic is monitored. The change in status may be associated with a change in purchase history of the user, a change in geographic location of the user, or a change in content associated with the active topic, for example. In response to the change in status, a query associated with the adaptive topic may be updated and performed, to provide an updated collection of content for the adaptive topic. In another feature, a navigation page including static and active topic markers may be reorganized over time according to a relevancy of adaptive topics, to provide an adaptive navigation page for the user.

22 Claims, 7 Drawing Sheets (56) References Cited

U.S. PATENT DOCUMENTS

| | | | | |
|---|---|---|---|---|
| 2012/0150642 A1* | 6/2012 | Kandanala | ............. | G06Q 30/02 705/14.53 |
| 2012/0290950 A1* | 11/2012 | Rapaport | ................ | H04L 51/32 715/753 |
| 2013/0282836 A1* | 10/2013 | DeLuca | ................ | G06Q 50/01 709/206 |
| 2014/0236953 A1* | 8/2014 | Rapaport | ............... | G06Q 10/10 707/740 |

OTHER PUBLICATIONS

U.S. Appl. No. 14/080,095, filed Nov. 14, 2013, Advisory Action mailed on Jun. 13, 2016.

U.S. Appl. No. 14/080,095, filed Nov. 14, 2013, Final Office Action mailed on Mar. 21, 2016.

U.S. Appl. No. 14/080,095, filed Nov. 14, 2013, Non-Final Office Action mailed on Sep. 25, 2015.

\* cited by examiner

ADAPTIVE TOPIC MARKER NAVIGATION

BACKGROUND

Many internet or network browser applications provide a means for a user to bookmark network pages or locations for quick and easy access at a later time. In this manner, a user may be able to refer to a list of saved bookmarks, and select one for quick access to a network page or location. In the overall context of bookmarks, it is noted that bookmarks are generally static and do not change over time. Meanwhile, the content and number of network pages generally change over time. In some cases, a bookmark may link to stale content depending upon the amount of time that has passed since the bookmark was established. In this context, it may be difficult for a user to keep track of which network pages are of interest.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

With the adoption of new types of client computing devices and cross-computing-platform solutions, users may expect additional assistance with the maintenance, organization, and presentation of information over time. A user may appreciate the ability of a browser application to display network pages or locations adaptively over time. Thus, according to the embodiments described herein, such adaptive content may be provided in connection with adaptive topics, and the topics may be selected or determined according to various factors such as a user's history of browsing activity or interests.

In this context, aspects of adaptive topic marker navigation are described herein. According to one feature of the embodiments, an adaptive topic is established and associated with a marker. Here, it is noted that the adaptive topic may be distinguished from a static topic, marker, or bookmark in that it may be automatically updated over time. The adaptive topic may be initially established based at least in part on a user's history of browsing activity or interests. For example, if the user is interested in movies or a certain sports team, then the adaptive topic may be established to assist the user by monitoring for changes relevant to his interests in movies or the sports team. In other embodiments, an adaptive topic may be established by an initial selection of a topic or query by a user, and the user may designate such selection or query as one for adaptive updates over time.

Once established, various changes in status associated with an adaptive topic may be monitored for over time. Among other examples described herein, a change in status may be associated with a change in browsing history of a user, a change in behavior of the user, a change in purchase history of the user, a change in geographic location of the user, a change in content associated with the active topic, a change in the user's typical needs over time, or other changes. In other embodiments, a change in status associated with an adaptive topic may be identified based on the collective or aggregate activity of several users or individuals. In response to a change in status, an updated collection of content may be provided for the adaptive topic. For example, based on the change in status, a query associated with the adaptive topic may be updated and a new query performed, to provide the updated collection of content for the adaptive topic. In another feature, a navigation page including static and active topic markers may be reorganized over time according to a current relevancy of adaptive topics, to provide an adaptive navigation page for the user.

Figure 1:
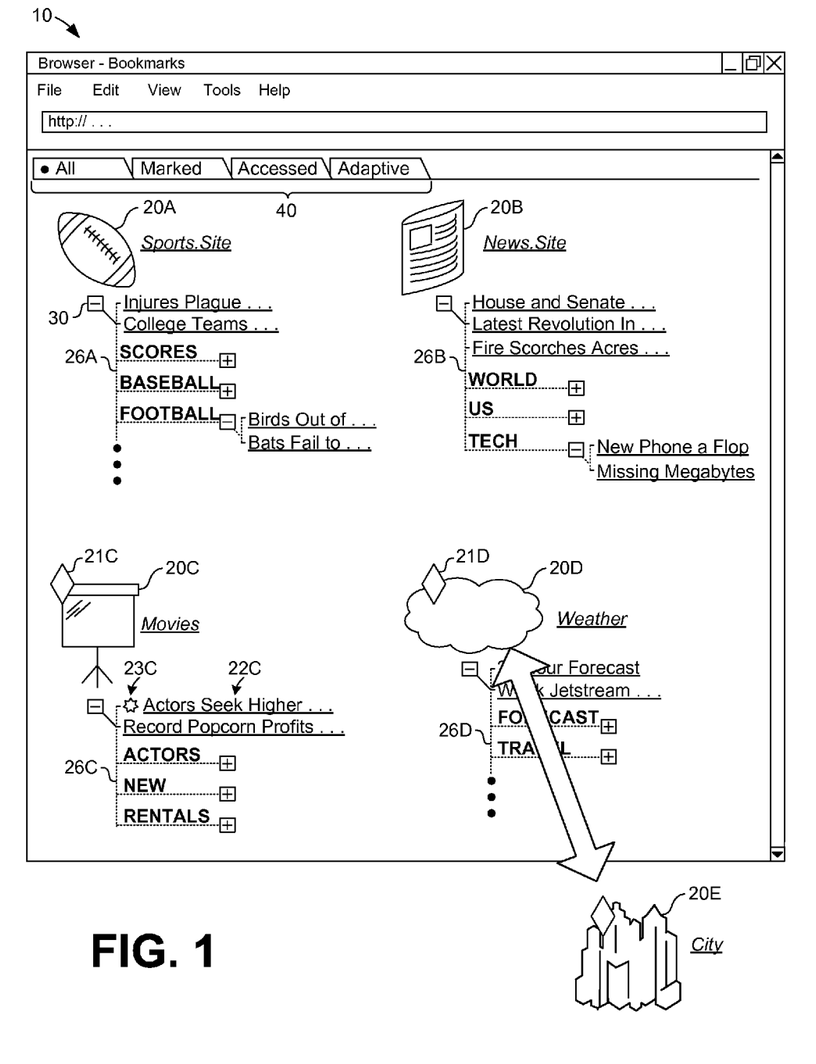
FIG. 1 illustrates an adaptive topic marker navigation display page according to various embodiments of the present disclosure.

Referring now to FIG. 1 for additional example context, an adaptive topic marker navigation page 10 is illustrated. The navigation page 10 is representative of a display provided at any suitable client device by a dedicated (e.g., a mobile application) or other browser application, such as an Internet, file system, or network browser application, for example. On the navigation page 10, various markers 20A, 20B, 20C, and 20D (collectively "markers 20") are illustrated. Each of the markers 20 is associated with one or more network pages, locations, or topics and may be selected for quick reference to the network pages, locations, or topics.

More particularly, in FIG. 1, the marker 20A is associated with the network location or host Sports.Site, the marker 20B is associated with the network location or host News.Site, the marker 20C is associated with the topic of movies, and the marker 20D is associated with the topic of weather. The topic markers 20C and 20D are adaptive (i.e., vary in content or form over time) according to the features described herein, and are distinguished in the navigation page 10 from the static markers 20A and 20B (i.e., markers that may or may not vary in content or form over time) by the diamond symbols 21C and 21D, respectively.

As referred to herein, network pages or network locations may refer to Internet web pages, directory locations in a computer file system, files in a computer file system, network directory or path names, network locations, drives, files, or other equivalents, by way of example and not limitation. Further, as referred to herein, topics may be related to various interests (e.g., movies, sports, activities, food, cars, sewing, news, weather, education, etc.), one or more network pages or locations, a search query for content or subject matter, a geographic location or proximity thereto, or other more general categories, by way of example and not limitation. Thus, each of the markers 20 offers an organized group of links or references to network pages or locations for quick and easy reference, and at least some of the markers 20 are adaptive and vary over time based on various considerations described herein.

Referring again to FIG. 1, each of the markers 20 includes an expandable hierarchy 26A, 26B, 26C, and 26D (collectively "hierarchies 26"), respectively, of network pages or locations presented in an organized fashion. In one aspect, the network locations are presented in the context of an overall directory structure hierarchy provided or hosted by the Sports.Site or News.Site network locations, for example. In other aspects, the organization of the expandable hierarchies may be determined based on likelihood of relevancy, likelihood of use or need, frequency of prior use or need, affinity, or according to another suitable arrangement. As illustrated, one or more ordinate, superordinate, or subordinate branches of the hierarchies 26 may be expanded by the expanders 30, to display various levels of hierarchical structure and associated content. It should be appreciated, however, that markers may reference one or more network pages or locations without being organized in the form of a hierarchy.

Based on the organization of the hierarchies 26, for example, ordinate, superordinate, and subordinate branches of the markers 20 may be provided with descriptors, as illustrated in bold and capital letters in FIG. 1. For example, the hierarchy 26A of the marker 20A includes the ordinate descriptors "SCORES", "BASEBALL," and "FOOTBALL." The markers 20B, 20C, and 20D also include similar descriptors for any ordinate, superordinate, or subordinate branches.

It is noted that, in FIG. 1, the markers 20A and 20B include marked locations. In general, the marked locations may be representative of network locations, pages, or files marked and registered by a user. That is, the marked locations may have been particularly designated by a user for registry as locations to be stored for reference in the future. In certain embodiments, the markers 20A and 20B may also include accessed locations (i.e., as distinguished from expressly marked locations) which may be representative of network locations, pages, or files accessed over time by a user. These accessed locations may be traced, assembled, and/or stored as a collection of accessed locations. Here, the accessed locations may be representative of locations which were accessed by a user over a period of time, but not particularly designated by the user for registry.

According to aspects described herein, marked, accessed, and adaptive locations may be organized together using markers in the navigation page 10. The navigation page 10 of FIG. 1 also includes selectable display tabs 40. Using the display tabs 40, the marked, accessed, and/or the adaptive locations may be omitted from the navigation page 10. In other words, if the marked tab is selected, then only marked or static markers will be displayed on the navigation page 10. Similarly, if the adaptive tab is selected, then only adaptive markers will be displayed on the navigation page 10.

Before turning to a general description of a system which maintains the navigation page 10, it is noted that the navigation page 10 may adapt over time. As two examples of the adaptive nature of the navigation page 10, both the content of the adaptive markers 21C and 21D and the organization of adaptive markers on the navigation page 10 may change over time. In this context, it is noted that network pages or locations associated with the adaptive marker 21C (and other adaptive markers) may be evaluated and/or monitored over time for relevancy, timeliness, affinity, or other appropriate changes, and be revised and updated over time. In FIG. 1, for example, the content link 22C to the "Actors Seek Higher . . . " network page, which is designated as being new by the star symbol 23C, is representative of a network page link which was recently added to the marker 20C. Here, it is noted that the title for the content link 22C may be determined from the title meta tag of the "Actors Seek Higher . . . " network page, or based on other suitable information from the network page.

As another example, static or adaptive topic markers may be added, removed, or reorganized on the navigation page 10. The relevancy of an adaptive topic may be compared with a reorganization threshold. When the relevancy of the adaptive topic exceeds (or falls below) the reorganization threshold, the navigation page 10 may be reorganized to include (or omit) an associated adaptive topic marker. In FIG. 1, for example, if the relevancy of the "city" adaptive topic, which is associated with the adaptive marker 20E, exceeds a reorganization threshold, then the marker 20E may be added to the navigation page 10. In various embodiments, the marker 20E may replace the marker 21D. In some cases, the addition or omission of one or more adaptive markers may prompt a full reorganization of the navigation page 10. In other embodiments, if the relevancy of an adaptive topic and/or new content associated with the adaptive topic exceeds a notification threshold, a notification may be sent to a user, and the navigation page 10 may be reorganized to highlight the new content. The notification may include an audible or haptic feedback notification, for example, depending upon the type of client device relied upon by the user.

In the following discussion, a general description of a system for expanded icon navigation and the generation of the navigation page 10 is provided, followed by a discussion of the operation of the same.

Figure 2:
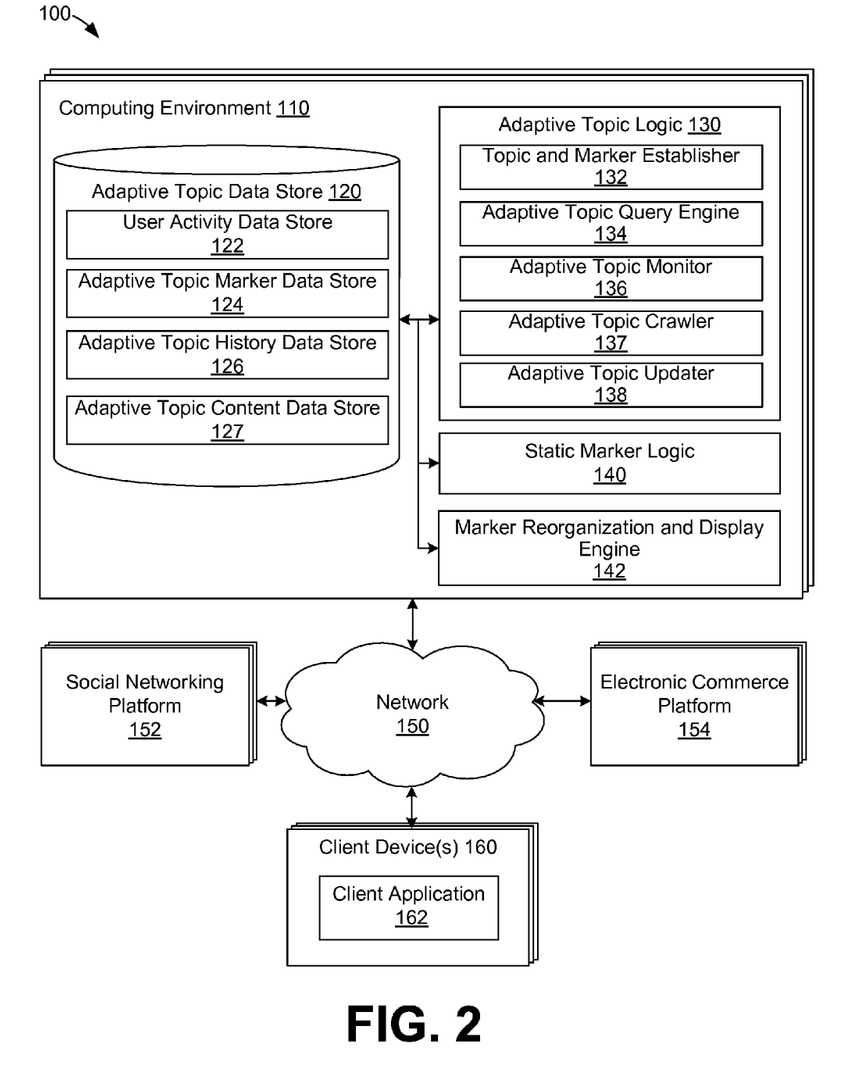
FIG. 2 illustrates a networked environment for adaptive topic marker navigation according to various embodiments of the present disclosure.

FIG. 2 illustrates a networked environment 100 for adaptive topic marker navigation according to various embodiments of the present disclosure. The networked environment 100 includes a computing environment 110, a network 150, a social networking platform 152, an electronic commerce platform 154, and a client device 160.

The computing environment 110 may be embodied as a computer, computing device, or computing system. In certain embodiments, the computing environment 110 may include one or more computing devices arranged, for example, in one or more server or computer banks. The computing device or devices may be located at a single installation site or distributed among different geographical locations. As further described below in connection with FIG. 6, the computing environment 110 may include a plurality of computing devices that together embody a hosted computing resource, a grid computing resource, and/or other distributed computing arrangement. In some cases, the computing environment 110 may be embodied as an elastic computing resource where an allotted capacity of processing, network, storage, or other computing-related resources varies over time.

The computing environment 110 may also be embodied, in part, as various functional (e.g., computer-readable instruction) and/or logic (e.g., device, circuit, or processing circuit) elements that may be executed by the computing environment 110 to direct the computing environment 110 to perform aspects of the embodiments described herein. As illustrated in FIG. 2, the computing environment 110 includes an adaptive topic data store 120, adaptive topic logic 130, static topic logic 140, and a marker reorganization and display engine 142, each of which is further described below.

Generally, the computing environment 110 is configured to establish and maintain one or more static and/or adaptive topic markers for one or more users. In this context, the computing environment 110 may be configured to establish an adaptive topic for a user with reference to various factors, such as the user's history of browsing activity, purchases, or interests, for example. The computing environment 110 may also be configured to monitor for a change in status associated with the one or more adaptive topics and, in response to the change in status, update the content or network locations associated with the adaptive topics. In turn, the computing environment 110 may be configured to refresh adaptive topic markers associated with the adaptive topics based on the updated content.

The network 150 may include the Internet, intranets, extranets, wide area networks (WANs), local area networks (LANs), wired networks, wireless networks, cable networks, satellite networks, other suitable networks, or any combinations thereof. It is noted that the computing environment 110 may communicate with the client device 160 over various protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation.

It is noted here that, although not illustrated, the network 150 includes connections to any number of network hosts, such as website servers, file servers, cloud computing resources, databases, data stores, or any other network or computing architectures. In this context, the client device 160 may access any of the computing resources communicatively coupled to the network 150, as would be understood in the art.

The social networking platform 152 may be embodied as a computer, computing device, or computing system that operates as one or more social networking platforms, such as Facebook®, Twitter®, Linked-In®, Flickr®, Instagram®, etc. In certain embodiments, the social networking platform 152 may be similar in composition to the computing environment 110, including one or more computing devices arranged, for example, in one or more server or computer banks. In various embodiments, the computing environment 110 may access the social networking platform 152 by way of the network 150, or the social networking platform 152 may be integrated with the computing environment 110. The social networking platform 152 may be relied upon by the computing environment 110 to explicitly and/or implicitly track or monitor the behavior and activities of one or more users or affiliated users, as further discussed below.

The electronic commerce platform 154 may be embodied as a computer, computing device, or computing system that operates as one or more electronic commerce platforms for selling goods or services. In certain embodiments, the electronic commerce platform 154 may be similar in composition to the computing environment 110, including one or more computing devices arranged, for example, in one or more server or computer banks. In various embodiments, the computing environment 110 may access the electronic commerce platform 154 by way of the network 150, or the electronic commerce platform 154 may be integrated with the computing environment 110. Generally, the computing environment 110 may access or refer to the social networking platform 152 and/or the electronic commerce platform 154 to monitor a user's history of browsing activity, interests, or purchases, for example. In other embodiments, the computing environment 110 may access or refer to the social networking platform 152 and/or the electronic commerce platform 154 to track or monitor activity of one or more affiliated users related to the user. In this context, the affiliated users may be one or more individuals having similar purchase histories, similar geographic locations, or similar personal statuses as the user.

The client device 160 is representative of one or a plurality of client devices of one or more users. The client device 160 may be embodied as any computing device, processing circuit, or processor based device or system, including those embodied in the form of a desktop computer, a laptop computer, a personal digital assistant, a wearable computing device, a cellular telephone, a set-top box, a music or media player, or a tablet computer, among other example computing devices and systems. The client device 160 may also include various peripheral devices, for example. In this context, the peripheral devices may include input devices such as, for example, a keyboard, keypad, touch pad, touch screen, microphone, scanner, mouse, joystick, camera, or one or more push buttons, etc. The peripheral devices may also include a display, indicator lights, speakers, global navigation satellite system (GNSS) circuitry, accelerometer, etc., depending upon the primary use of the client device 160.

As illustrated in FIG. 2, the client device 160 may execute various applications, such as client application 162, which is representative of one application that may be executed on the client device 160. In one embodiment, the client application 162 may be embodied as a browser application that interacts with the computing environment 110 via the network 150. To this end, the client application 162 may be embodied as, for example, an available off-the-shelf hypertext-based internet browser such as Internet Explorer®, Firefox®, Chrome®, Silk®, or another type of browser, or a variant thereof, without limitation. Alternatively, the client application 162 may be embodied as one or more other applications that interact with the computing environment 110 using a suitable protocol via the network 150. Generally, when executed in the client device 160, the client application 162 renders a webpage or similar user interface on a display of the client device 160.

According to certain aspects described herein, the client application 162 operates in concert with the adaptive topic logic 130 of the computing environment 110. Particularly, as a user of the client device 160 navigates network locations accessible via the network 150, the adaptive topic logic 130 performs certain aspects of the embodiments described herein, such as establishing adaptive topics associated with adaptive topic markers, monitoring for changes in status associated with the adaptive topics, updating and performing queries associated with the adaptive topics over time, and refreshing adaptive topic markers. In other aspects, the adaptive topic logic 130 may reorganize one or more adaptive or static topic markers, as further described below. Further, the adaptive topic logic 130 may send a notification to a user regarding changes associated with an adaptive topic or adaptive topic marker.

Next, a more detailed description of the operation of the computing environment 110 is provided with reference to FIG. 2. Here, it may be assumed among the examples described herein that a user of the client device 160 manipulates the client application 162 to browse web pages, network locations, network files, etc. on the network 150. The browsing may be performed in connection with the computing environment 110. For example, the computing environment 110 may follow, track, and monitor the user's browsing over time and assist the user by maintaining both static and adaptive topic markers. Further, the computing environment 110 may operate as a network crawler or automatic indexer that regularly browses the network 150 to identify new content associated with adaptive topics. In the computing environment 110, the adaptive topic logic 130 includes one or more logic elements that perform or embody various aspects of the features described herein, including a topic and marker establisher 132, an adaptive topic query engine 134, and an adaptive topic monitor 136, an adaptive topic crawler 137, and an adaptive topic updater 138.

The topic and marker establisher 132 is configured to establish one or more adaptive topics for one or more users based on various factors, such as a user's history of browsing activity, history of purchases, or interests. For example, if the topic and marker establisher 132 identifies that a user is interested in movies or a certain sports team based on the user's browsing history, then an adaptive topic may be automatically established to monitor for content and changes in content related to his interests in movies or the sports team.

In other embodiments, an adaptive topic may be established based on an initial selection of a topic or query by a user, such as a query for restaurants, cars, activities, etc. As another example, the topic and marker establisher 132 may be configured to establish an adaptive topic based on a specific input from a user, and the user may designate the adaptive topic as one for which adaptive updates are desired over time. Thus, the topic and marker establisher 132 is configured to manually (i.e., based on direct user input to establish the topic) and/or automatically (i.e., without direct user input) establish an adaptive topic and associated marker for any topic a user has or appears to have an affinity to. This affinity may be determined according to any of the means or manners consistent with the scope and spirit of the embodiments described herein.

The adaptive topic query engine 134 is configured to search for and identify network pages or locations associated with one or more of the adaptive topics. In other words, the adaptive topic query engine 134 is configured to search for content (e.g., web pages, files, network locations, etc.) associated with adaptive topics. The adaptive topic query engine 134 may be embodied as a type of internet, file system, network, or other search engine, without limitation. In this context, the adaptive topic query engine 134 may execute a query developed and submitted by the adaptive topic updater 138, as further described below. The adaptive topic query engine 134 may search the adaptive topic content data store 124, for example, or other network locations on the network 150.

The adaptive topic monitor 136 is configured to monitor for changes in status associated with one or more adaptive topics. The adaptive topic monitor 136 may take various factors into consideration when monitoring for the changes in status. Among other factors, for example, the adaptive topic monitor 136 may be configured to track a user's access requests associated with adaptive topics, track the user's access requests based on time of day, monitor for new content related to adaptive topics, identify a change in a user's purchase history, track activity of one or more affiliated users, identify a change in geographic location of a user or a client device, identify a type of (or change in) client device used, or identify web locations of ingress and egress associated with an adaptive topic.

It should be appreciated that the adaptive topic monitor 136 may be configured to monitor for changes in status associated with an individual user, an affiliated group of users, a non-affiliated group of individuals, or any combination thereof. Thus, while the adaptive topic monitor 136 is described as monitoring for changes in status for one user or individual, the adaptive topic monitor 136 may monitor for changes in status associated with both individuals and/or among larger groups of users or individuals. Further, it should also be appreciated that new topics may be established based on status changes identified by the adaptive topic monitor 136. Also, after changes in status are identified, the adaptive topic monitor 136 may operate in concert with the adaptive topic updater 138 to update one or more of the adaptive topics according to the changes.

With regard to tracking a user's access requests associated with adaptive topics based on time of day, the adaptive topic monitor 136 may monitor the user's habits and how they vary over time. For example, the adaptive topic monitor 136 may determine which network pages or locations are typically accessed by the user during the morning, afternoon, and evening. This information may be used to adaptively change the content associated with adaptive topics and markers for display on the navigation page 10 throughout the day. A user may start his day with the weather, check mail during lunch, and research activities or hobbies in the evening, for example, and one or more adaptive topics may be updated accordingly. In this sense, not only does the adaptive topic monitor 136 follow the user's habits over time, but the adaptive topic monitor 136 also tracks the current time of day to anticipate when adaptive topic markers should be updated according to past activity. In this regard, the adaptive topic monitor 136 may store a history of user activity (e.g., browsing history and patterns) for various users in the user activity data store 122 for reference.

In other aspects, the adaptive topic monitor 136 may identify changes in a user's purchase history. Here, the adaptive topic monitor 136 may access or refer to the electronic commerce platform 154 for any changes or updates in the user's purchase history over time. This purchase history information may be relevant to the user's interests, future interests or activities, future purchases, or other factors. To the extent that the purchase history or changes in the purchase history are representative of the user's interests, the adaptive topic monitor 136 may rely upon this information to update the adaptive topic markers accordingly. As one example, if a user purchases a plane ticket to a certain city, then the adaptive topic monitor 136 may search for relevant content associated with that city, such as restaurants, the weather, attractions, etc. As another example, if a user purchases a new mountain bike, then the adaptive topic monitor 136 may search for relevant content related to biking, such as biking trails, biking articles, etc.

Additionally, the adaptive topic monitor 136 may track the activity of one or more affiliated users. In this context, affiliated users may be one or more individuals having similar purchase histories, similar geographic locations, or similar personal statuses as a user for whom an adaptive topic and marker were established. Once affiliated users are identified by the adaptive topic monitor 136 for a particular user, the adaptive topic monitor 136 may update the particular user's adaptive topics based on the activities of the affiliated users. In this sense, it may be considered that the interests of the affiliated users align substantially with that of the particular user, and the interests of the affiliated users are representative of those of the particular user. Thus, if the affiliated users suddenly begin to make certain purchases or frequent a certain restaurant or attraction, for example, then the adaptive topic monitor 136 may update the adaptive topic markers for the particular user based on this information. The adaptive topic monitor 136 may track the activity of affiliated users by accessing the social networking platform 152, for example, or by other suitable means.

In still other aspects, the adaptive topic monitor 136 may identify a change in geographic location of a user or a client device of the user. A change in geographic location may be identified using global positioning (e.g., GNSS) circuitry of the client device 160, base station identification, or internet protocol address, for example. To the extent that the change in geographic location may impact the content associated with the adaptive topics, the adaptive topic monitor 136 may identify this change in location and seek to update the adaptive topics accordingly. As one example, the adaptive topic monitor 136 may determine a home region of a user based on the user's history of locations. In other words, if the adaptive topic monitor 136 identifies that a user generally travels between home, work, and a certain number of other locations, the adaptive topic monitor 136 may determine this nominal region as a "home region" for the user. When the user moves outside this home region, the adaptive topic monitor 136 may identify such movement as a status change. As another example, if an adaptive topic for "entertainment" has been established for a user, and this topic is populated with content associated with entertainment in a particular city, then the adaptive topic monitor 136 may trigger an update to the topic automatically when the user travels to another city.

The adaptive topic monitor 136 may also identify a type of (or change in) client device used by a user. Here, in as much as the type of client device being used impacts the network pages or locations associated with the adaptive topics, the adaptive topic monitor 136 may trigger an update to the adaptive topics. As one example, the network pages or locations for a "food" adaptive topic may change depending upon whether a user is using a desktop computer, a laptop computer, or a mobile telephone, as the user may prepare food at home if using a desktop computer but visit a restaurant if using a mobile telephone.

As a final example, the adaptive topic monitor 136 may identify locations of ingress and/or egress associated with an adaptive topic. That is, the adaptive monitor 136 may monitor those locations from which (ingress) or to which (egress) a user typically browses to or from a network page. If users affiliated with a particular user browse from a first page to a second page with a high degree of frequency, then an adaptive topic for the particular user may be updated to include both the first and second pages. Generally, the monitoring examples of the adaptive monitor 136 are exemplary and should not be considered limiting, as other factors within the scope and spirit of the embodiments described herein may be taken into account.

The adaptive topic crawler 137 is configured to crawl, search, index, and/or browse the network 150 to identify new content associated with adaptive topics. This new content (or references to the new content) may be stored in the adaptive topic content data store 127, for example. Over time, as new content associated with one or more adaptive topics is identified by the adaptive topic crawler 137, one or more adaptive topics may be updated to include references to the new content, as described herein. In various embodiments, the adaptive topic crawler 137 may be configured to automatically and/or periodically browse the network 150 over time. Further the adaptive topic crawler 137 may be directed according to or based on what adaptive topics have been established by the topic and marker establisher 132 for more directed results.

The adaptive topic updater 138 is configured to update one or more queries associated with one or more adaptive topics. In this context, a "query" may be embodied as a search string presented to the adaptive topic query engine 134. For example, if the adaptive topic monitor 136 identifies that a "movies" adaptive topic needs to be updated because a particular user has traveled to another city for a vacation, then the adaptive topic updater 138 may update one or more queries associated with the "movies" topic to reflect that change in location. The update may include substituting the name of a city, a zip code, or other information representative of location (or change thereof) in a query associated with the "movies" topic. In various embodiments, the adaptive topic updater 138 may submit the query to the adaptive topic query engine 134 or to another network location on the network 150.

In other aspects, rather than updating a query, the adaptive topic updater 138 may be configured to refer to content (or references to content) stored in the adaptive topic content data store 127, or substitute content associated with an adaptive topic according to a trigger or prompt from the adaptive topic monitor 136. If the adaptive topic monitor 136 identifies that one or more adaptive topics should be updated based on time of day, for example, then the adaptive topic updater 138 may access the adaptive topic content data store 127 to identify the appropriate content based on the time of day.

Here, it is noted that, as content associated with adaptive topics is updated and changed over time, the content (and updates thereto) may be stored in the adaptive topic marker data store 124 and/or the adaptive topic content data store 127. In this context, it is noted that the adaptive topic marker data store 124 may store adaptive topics for various users. Further, the adaptive topic content data store 127 may store network pages, such as web pages, network content, or network locations (or references thereto) associated with the adaptive topics, for reference by the adaptive topic logic 130 and the client device 160. Additionally, a history of the changes in content associated with the adaptive topics may be stored in the adaptive topic history data store 126. That is, the adaptive topic history data store 126 may store a history of changes in the content associated with adaptive topics over a period of time. Using the adaptive topic history data store 126, a user can revert to a prior state of an adaptive topic and adaptive topic marker, as further described below.

The static marker logic 140 is configured to establish one or more static markers for one or more users. Each of the static markers may be associated with a marked web page, network page, network file, etc. In this context, a marked web page may be one which was designated, tagged, or "bookmarked" by a user for future reference. In contrast to adaptive markers, static markers are generally not adapted over time by the adaptive topic logic 130. In some embodiments, however, the static markers may include both content bookmarked by one or more users as well as content hosted in a hierarchy surrounding the content. Examples of such surrounding content, the hierarchy in which it may be identified, and the manner in which it may be presented in a static maker are further described in U.S. patent application Ser. No. 14/080,086, titled "Expanded Icon Navigation," filed Nov. 14, 2013, the entire contents of which is hereby incorporated herein by reference.

The marker reorganization and display engine 142 is configured, generally, to organize the display of static and adaptive markers on the navigation page 10 based on various factors. In some embodiments and aspects, the marker reorganization and display engine 142 may rely upon one or more reorganization thresholds to determine the appropriate time in which to change the arrangement of the static and adaptive markers on the navigation page 10. As described above, the adaptive topic monitor 136 may monitor the time of day and attribute a higher (or lower) relevancy to an adaptive topic or certain content in an adaptive topic based on time of day. Similarly, the adaptive topic monitor 136 may monitor geographic location of the client device 160 and attribute a higher (or lower) relevancy to an adaptive topic based on geographic location.

In the context described above, the marker reorganization and display engine 142 may compare a relevancy of one or more adaptive topics with one or more reorganization thresholds, to determine whether the relevancies exceed the reorganization thresholds. When one or more relevancies exceed (or fall below) the reorganization thresholds, the adaptive topic monitor 136 may reorganize the navigation page 10 to include (or exclude) one or more adaptive topic markers accordingly. In FIG. 1, for example, if the relevancy of the "city" adaptive topic, which is associated with the adaptive marker 20E, exceeds a reorganization threshold, then the marker 20E may be added to the navigation page 10. In various embodiments, the marker 20E may replace the marker 21D. In some case, the addition or omission of one or more adaptive markers may prompt a full reorganization of the navigation page 10. In other embodiments, if the relevancy of an adaptive topic and/or new content associated with the adaptive topic exceeds a notification threshold, a user may be notified, and the navigation page 10 may be reorganized to highlight the new content. The notification may include an audible or haptic feedback notification, for example, depending upon the type of client device relied upon by the user.

Figure 3A:
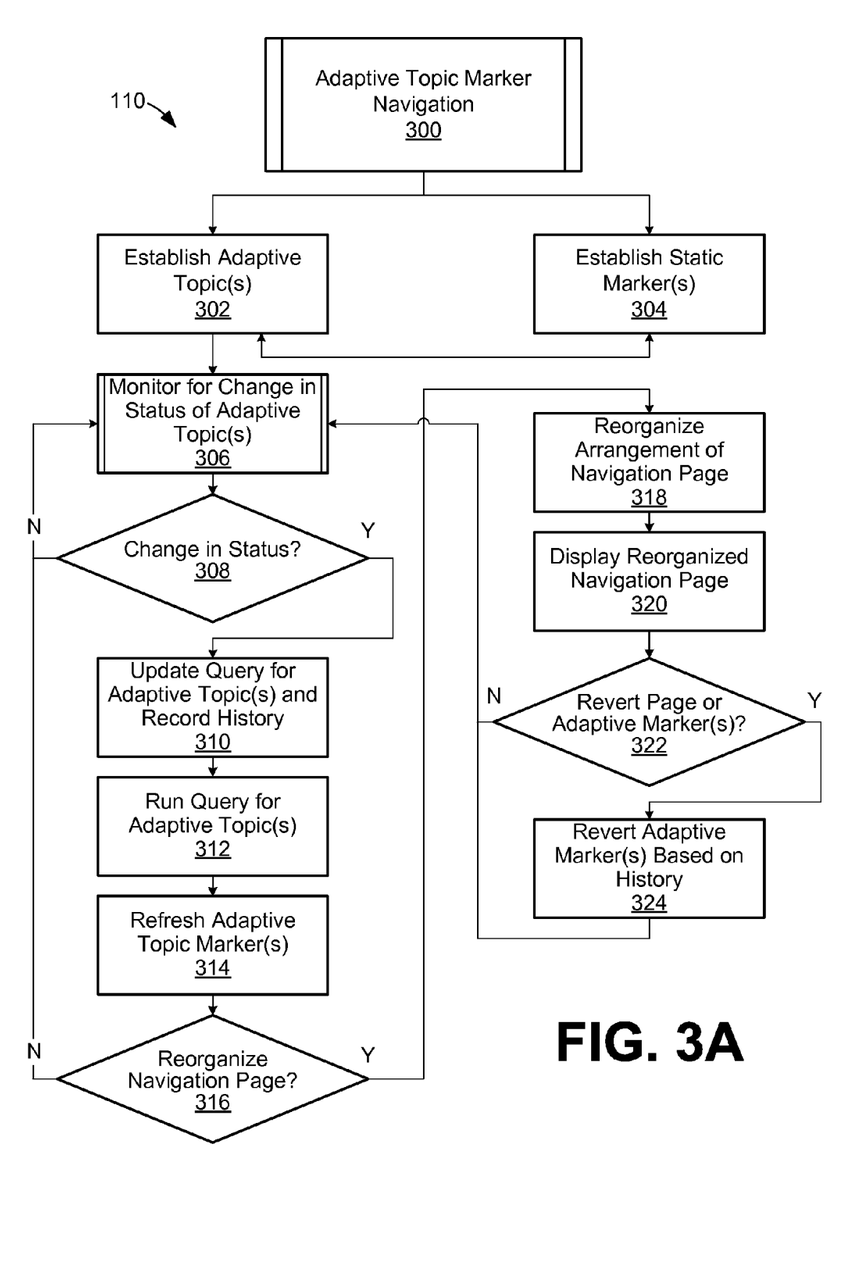
FIG. 3A illustrates an example adaptive topic marker navigation process performed by the computing environment of FIG. 2 according to various embodiments of the present disclosure.

Referring next to FIG. 3A, an example adaptive topic marker navigation process 300 performed by the computing environment 110 of FIG. 2 is illustrated. The process 300 is also described in connection with FIG. 4, which illustrates another variation on the navigation page 10. It should be appreciated that that the flowchart of FIG. 3A provides merely one example of a functional arrangement that may be employed to implement the operations of the computing environment 110, as described herein. Here, it is noted that, although the process 300 is described in connection with the computing environment 110 of FIG. 2, other computing environments may perform the processes illustrated in FIG. 3A. In certain aspects, the flowchart of FIG. 3A may be viewed as depicting an example group of steps performed by the computing environment 110 according to one or more embodiments.

At reference numeral 302, the process 300 includes establishing one or more adaptive topics with reference to a history of activity. The history of activity may be that of a user of the client device 160. For example, if the user often searches for weather, then the process 300 may include establishing a "weather" adaptive topic and topic marker, such as the weather adaptive topic marker 20D in FIG. 4. In one embodiment, adaptive topics may be established automatically by the adaptive topic marker establisher 132 in FIG. 2. In other embodiments, an adaptive topic may be established by a user without reference to any history of activity, but based on a specific request by the user to adaptively monitor activity related to one or more designated topics. At reference numeral 304, the process 300 includes establishing one or more static markers, such as the markers 20A and 20B in FIG. 4. As described above, static markers (e.g., bookmarks) may be established by a user by the static marker logic 140.

At reference numeral 306, the process 300 includes monitoring for a change in status associated with the adaptive topics established at reference numeral 302. Aspects of the monitoring at reference numeral 306 are described in further detail below in connection with FIG. 3B. At reference numeral 308, the process 300 includes determining whether a change in status was identified at reference numeral 306. If no change in status was identified, then the process 300 proceeds back to reference numeral 306 for further monitoring. If a change in status was identified, then the process 300 continues to reference numeral 310.

At reference numeral 310, the process 300 includes updating, in response to the change in status identified at reference numeral 306, a query associated with one or more adaptive topics. The updating may be performed by the adaptive topic updater 138 in FIG. 2, for example. Depending upon the change in status detected at reference numeral 306, the updating may include updating a location aspect of the query, updating a term of the query, or updating the scope of the query, among other updates. As one example, if the change in status identifies that a particular user recently purchased a ticket for a movie titled "New Film," then the process 300 may include updating a query for the movies adaptive topic 20C to include a search for the "New Film" at reference numeral 310.

Figure 4:
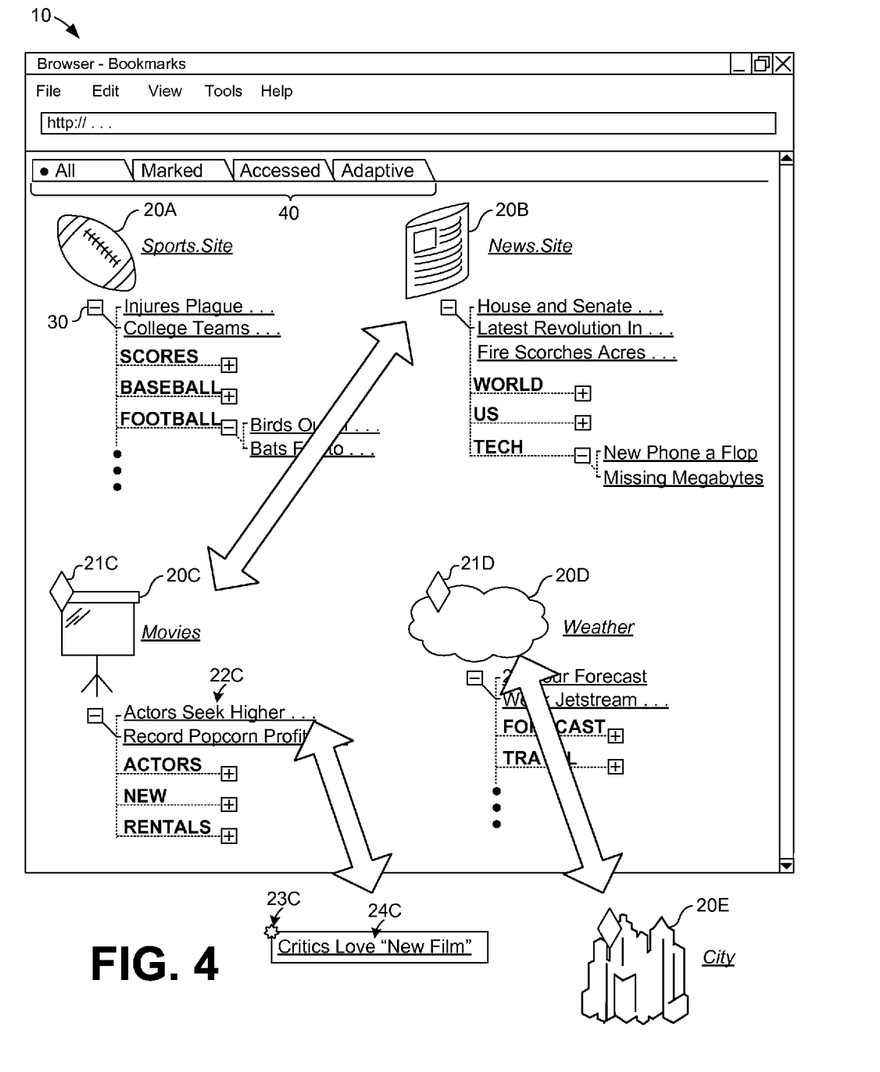
FIG. 4 illustrates another adaptive topic marker navigation display page according to various embodiments of the present disclosure.

At reference numeral 312, the process 300 includes running the updated query to provide one or more updated collections of web pages, web page links, network locations, network files, etc. The query may be performed by the adaptive topic query engine 134 in FIG. 2, for example. Here, the updated collection may include new or varied content to be associated with an adaptive topic. As illustrated in FIG. 4, the updated search for the "New Film" may return the new content 24C, which may be a link to a web page including relevant commentary.

In this manner, new content associated with adaptive topics may be identified and updated over time. It should also be appreciated that, not every change in status identified at reference numeral 306 necessarily requires an updated query. For example, based on a status change, the adaptive topic monitor 136 may retrieve or refer back to content stored in the adaptive topic marker data store 120. In this sense, it should be appreciated that the adaptive topic query engine 134 may query the adaptive topic data store 120 when searching for collections of web pages, web page links, network locations, network files, etc.

At reference numeral 314, the process 300 includes refreshing one or more adaptive topic markers. Here, the adaptive topic updater 138 in FIG. 2 may refresh one or more adaptive topic markers using the updated collections of content identified by the adaptive topic query engine 134. As illustrated in FIG. 4, for example, the movies adaptive topic marker 20C may be refreshed to include the new content 24C. In various embodiments, refreshing one or more adaptive topic markers may include re-arranging and/or replacing content in a marker. In this context, the new content 24C may replace the content 22C, or the new content 24C may be added above the content 22C. Also, when the adaptive topic marker 20C is refreshed, the new content 24C may be designated as "new" with the star symbol 23C, for quick identification by a user.

It should be appreciated that, according to embodiments described herein, several adaptive topic markers may be updated and refreshed over time, as necessary, to include the most relevant content for a user based on the factors described herein. Also, the processes in reference numerals 306, 308, 310, 312, and 314 may occur separately for each of the adaptive topics, and continue over time.

Referring back to FIG. 3A, at reference numeral 316, the process 300 includes determining whether to reorganize a navigation page. In this context, the relevancy of markers may be compared with each other and/or certain relevancy thresholds. The determining may be performed by the marker reorganization and display engine 142 in FIG. 2. If it is determined that a reorganization is not needed at reference numeral 316, then the process 300 proceeds back to reference numeral 306. Otherwise, if it is determined that a reorganization is warranted at reference numeral 316, then the process 300 proceeds to reference numeral 318.

At reference numeral 318, the process 300 includes reorganizing an arrangement of adaptive and/or static topic markers on a navigation page. For context, in FIG. 4, the navigation page 10 may be reorganized, as necessary, to highlight certain topics which are most relevant based on one or more of the factors described herein. It should be appreciated that this reorganization may occur at certain points in time based on status changes in the relevancy of adaptive and/or static markers. Generally, when content is updated based upon a new query, for example, reorganization may occur.

The reorganization may be performed by the marker reorganization and display engine 142 in FIG. 2, for example. In this context, the marker reorganization and display engine 142 may compare the relevancy of one or more adaptive and/or static topics with each other or to one or more reorganization thresholds, to determine whether a change in relevancy merits reorganization of the markers on the navigation page 10. If the relevancy of the "city" adaptive topic 20E exceeds a reorganization threshold, for example, then the marker 20E may be added to the navigation page 10. In one embodiment, the marker 20E may replace the marker 21D. In another embodiment, the marker 20E may be added to the navigation page 10 above or next to the marker 21D. Also, when the adaptive topic marker 20E is added to the navigation page 10, the marker 20E may be designated as "new" with the star symbol similar to symbol 23C, for quick identification by a user. As another example, if the relevancy of the "movies" adaptive topic 20C exceeds that of the "News.Site" static marker 20B, then the marker 20C may be reorganized to be before the marker 20B.

Generally, the relevancy of any given adaptive or static marker may be updated by the adaptive topic monitor 136 in FIG. 2, according to any of the factors described herein, such as changes in purchase history, time of day, browsing activity, geographic location, affinity with other users, etc. This change in relevancy may lead to a reorganization of the navigation page 10 by the reorganization and display engine 142. The reorganization of the navigation page 10 may be performed by regeneration of the page, or the reorganization may be achieved in dynamically using Asynchronous JavaScript® and XML (AJAX) or another other active scripting method.

After reorganization at reference numeral 318, the process 300 includes displaying the reorganized navigation page at reference numeral 320. In this context, the reorganized navigation page 50 of FIG. 5 may be displayed on the client device 160 after reorganization occurs. In other words, the marker reorganization and display engine 142 may generate the reorganized navigation page 50 for rendering and display by the client device 160, and communicate the reorganized navigation page 50 to the client device 160 by way of the network 150.

Figure 5:
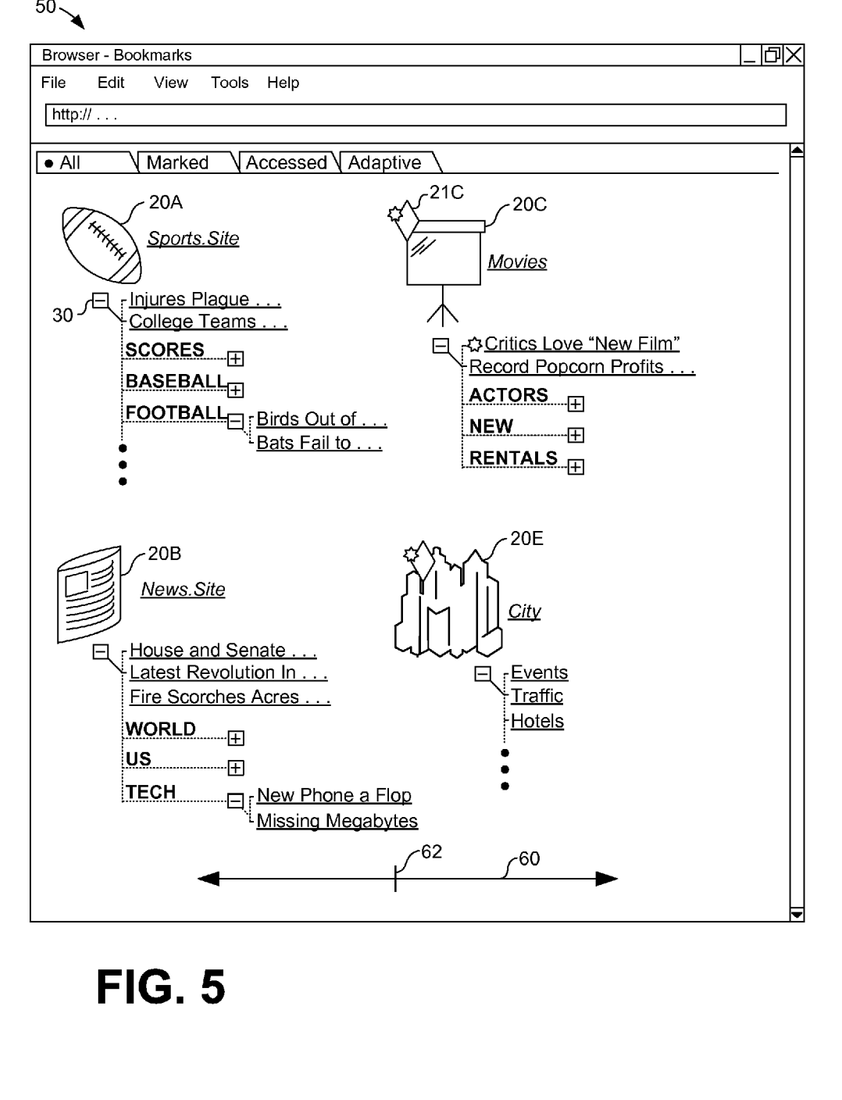
FIG. 5 illustrates a reorganized adaptive topic marker navigation display page according to various embodiments of the present disclosure.

Compared to the navigation page 10, in the reorganized navigation page 50, the marker 20C was moved into a position before the marker 20B, and the marker 20E replaced the marker 20D, which is now omitted. It should also be appreciated that, before generating the reorganized navigation page 50, the marker reorganization and display engine 142 may have previously generated the navigation page 10 and communicated it to the client device 160 for rendering and display.

Referring again to FIG. 3A, the process 300 proceeds to reference numeral 322, where it is determined whether to revert one or more adaptive markers or a navigation page (in its entirety) to a prior state in time. For example, as illustrated in FIG. 5, the reorganized navigation page 50 includes a reversion slider 60 as an input mechanism for a user to revert the navigation page 50 to a prior state in time. In various embodiments, each of the adaptive markers on a navigation page may include a reversion slider, respectively, or the navigation page may include a single reversion slider applicable to all markers on the page. In this sense, the reversion slider 60 is provided by way of example of a slider applicable to all markers on the page 50. Generally, reversions may be performed by the marker reorganization and display engine 142 with reference to the adaptive topic history data store 126 in FIG. 2. For example, when an adaptive topic marker or navigation page is updated and/or reorganized over time, the marker reorganization and display engine 142 may store the changes over time to the adaptive topic history data store 126, for later reference. By sliding the handle 62 of the reversion slider 60 (e.g., to the right or left), a user may request a prior state of the navigation page 50.

If it is determined at reference numeral 322 that a request to revert was not received, then the process 300 proceeds back to reference numeral 306. Alternatively, if it is determined at reference numeral 322 that a request to revert was received, then the process 300 proceeds to reference numeral 324, which includes reverting one or more adaptive markers or a navigation page to a prior state in time. At reference numeral 324, the marker reorganization and display engine 142 references the adaptive topic history data store to determine the prior state of the adaptive markers or a navigation page, and updates the markers or page accordingly. As one example, based upon an input from a user, the marker reorganization and display engine 142 may revert the reorganized navigation page 50 in FIG. 5 to the prior state of the navigation page 10 in FIG. 4. Generally, using the reversion slider 60, a user may request reversion to any prior state in time, limited only by the storage requirements for the history of adaptation over time. After reference numeral 324, the process 300 proceeds back to reference numeral 306, to continue monitoring for any status changes in adaptive topics.

Figure 3B:
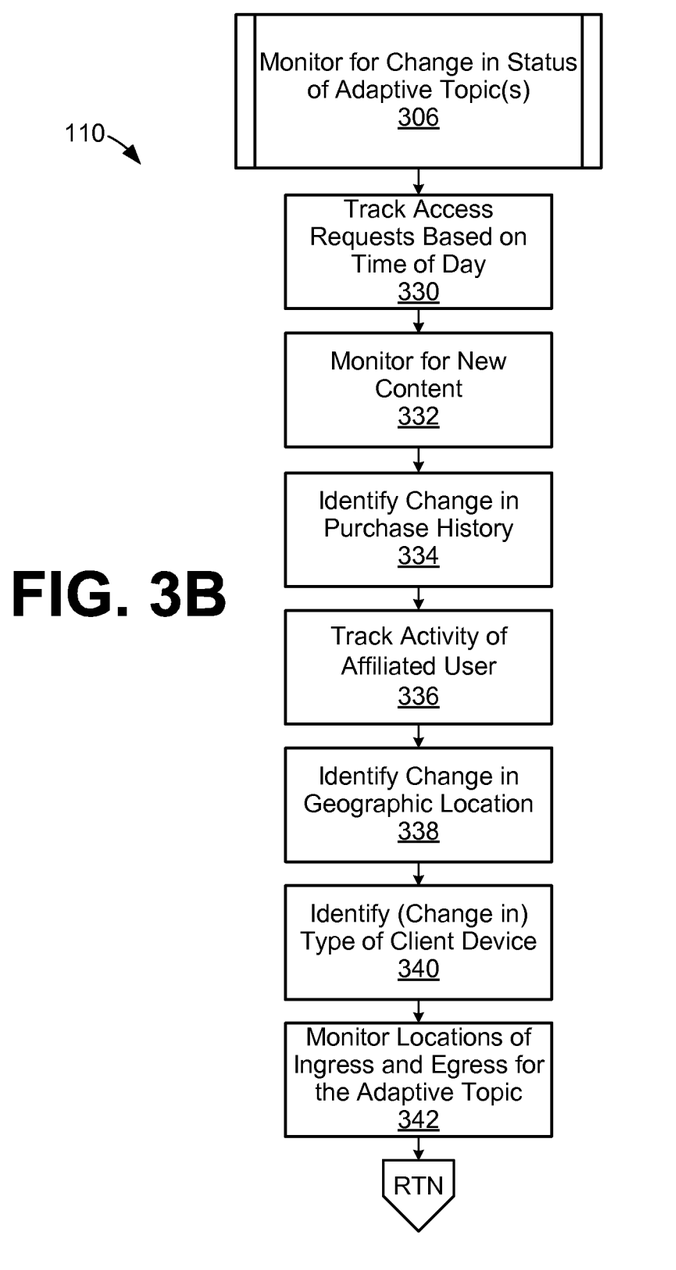
FIG. 3B illustrates an example adaptive monitoring process in the overall adaptive topic marker navigation process performed by the computing environment of FIG. 2 according to various embodiments of the present disclosure.

Turning to FIG. 3B, an example of the adaptive monitoring process 306 in the overall adaptive topic marker navigation process 300 in FIG. 3B is illustrated. It should be appreciated that the adaptive monitoring process 306 may monitor for changes in status associated with an individual user, an affiliated group of users, a non-affiliated, larger group of individuals, or any combination thereof. Thus, while the adaptive monitoring process 306 is described as monitoring for changes in status for one user or individual, the adaptive topic monitor 136 may monitor for changes in status associated with both individuals and/or among larger groups of users or individuals.

At reference numeral 330, the process 306 includes tracking access requests associated with one or more adaptive topics based on time of day. Here, the adaptive topic monitor 136 in FIG. 2 can determine the daily patterns of users and, as time changes over the day, whether adaptive topic markers should be updated accordingly. At reference numeral 332, the process 306 includes monitoring for new content related to one or more adaptive topics. For example, the adaptive topic crawler 137 may regularly crawl or index the network 150 to identify new content associated with adaptive topics, as described above. Additionally or alternatively, a query related to an adaptive topic may be performed by the adaptive topic query engine 134, and the results compared with results from a prior query, to determine whether new content is available.

At reference numeral 334, the process 306 includes identifying one or more changes in purchase histories of users. As described above, the changes in purchase history may be used to update queries for adaptive topics. At reference numeral 336, the process 306 includes tracking the activity of one or more affiliated users which are related to a particular user. As described above, it may be considered that the interests of affiliated users align substantially with that of a particular user, and the interests of the affiliated users (or changes in such interests) may be relied upon to update adaptive topics for the particular user.

At reference numeral 338, the process 306 includes identifying a change in geographic location of a user or a client device of the user. As noted above, changes in geographic location may be relied upon to update adaptive topics to include more relevant content and/or results. At reference numeral 340, the process 306 includes identifying a type of the client device used. In as much as the type of client device being used impacts the relevancy of content associated with adaptive topics, the adaptive monitor 136 in FIG. 2 may update adaptive topics based on the type of client device. Finally, at reference numeral 342, the process 306 includes identifying web locations of ingress and egress associated with the adaptive topic, and updates may be made to the adaptive topics based on common locations of ingress and egress as described herein.

Thus, according to aspects of the embodiments described herein, a change in status associated with an adaptive topic may be monitored. Among other examples described herein, the change in status may be associated with a change in browsing history of the user, a change in behavior of the user, a change in purchase history of the user, a change in geographic location of the user, a change in content associated with the active topic, or a change in the user's typical needs over time. In response to a change in status, a query associated with the adaptive topic may be updated and a new query performed, to provide an updated collection of content for the adaptive topic. In another feature, a navigation page including static and active topic markers may be reorganized over time according to a current relevancy of adaptive topics, to provide an adaptive navigation page for the user. The adaptive topics of the adaptive navigation page may assist the user by providing and refreshing relevant content automatically over time.

Figure 6:
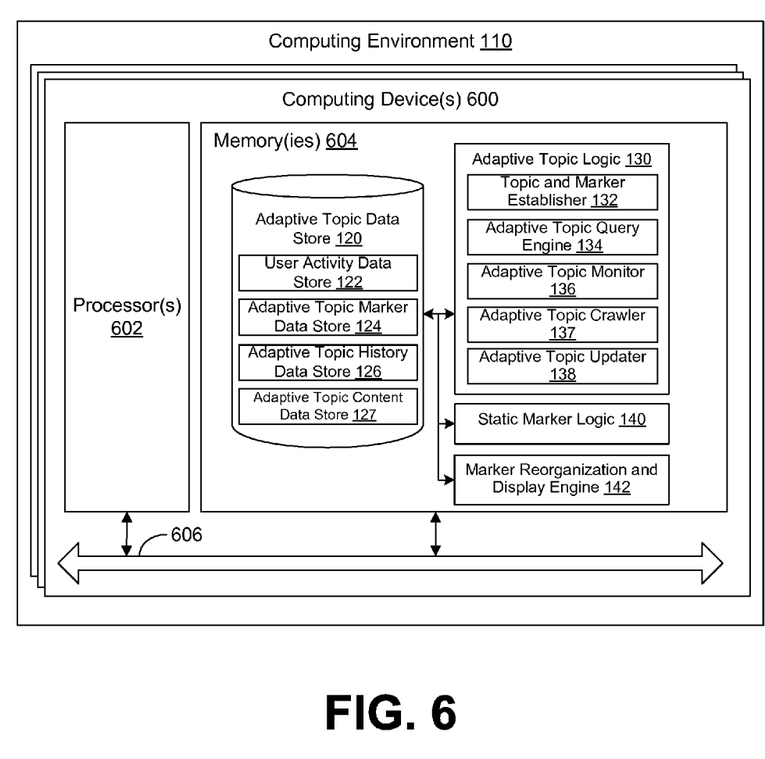
FIG. 6 illustrates an example schematic block diagram of the computing environment employed in the networked environment of FIG. 2 according to various embodiments of the present disclosure.

FIG. 6 illustrates an example schematic block diagram of the computing environment 110 employed in the networked environment 100 of FIG. 2 according to various embodiments of the present disclosure. The computing environment 110 includes one or more computing devices 600. Each computing device 600 includes at least one processing system, for example, having a processor 602 and a memory 604, both of which are electrically and communicatively coupled to a local interface 606. To this end, each computing device 600 may be embodied as, for example, at least one server computer or similar device. The local interface 606 may be embodied as, for example, a data bus with an accompanying address/control bus or other bus structure as can be appreciated.

In various embodiments, the memory 604 stores data and software or executable-code components executable by the processor 602. For example, the memory 604 may store executable-code components associated with the adaptive topic logic 130, for execution by the processor 602. The memory 604 may also store data such as that stored in the adaptive topic data store 120, among other data.

It should be understood and appreciated that the memory 604 may store other executable-code components for execution by the processor 602. For example, an operating system may be stored in the memory 604 for execution by the processor 602. Where any component discussed herein is implemented in the form of software, any one of a number of programming languages may be employed such as, for example, C, C++, C#, Objective C, JAVA®, JAVASCRIPT®, Perl, PHP, VISUAL BASIC®, PYTHON®, RUBY, FLASH®, or other programming languages.

As discussed above, in various embodiments, the memory 604 stores software for execution by the processor 602. In this respect, the terms "executable" or "for execution" refer to software forms that can ultimately be run or executed by the processor 602, whether in source, object, machine, or other form. Examples of executable programs include, for example, a compiled program that can be translated into a machine code format and loaded into a random access portion of the memory 604 and executed by the processor 602, source code that can be expressed in an object code format and loaded into a random access portion of the memory 604 and executed by the processor 602, or source code that can be interpreted by another executable program to generate instructions in a random access portion of the memory 604 and executed by the processor 602, etc. An executable program may be stored in any portion or component of the memory 604 including, for example, a random access memory (RAM), read-only memory (ROM), magnetic or other hard disk drive, solid-state, semiconductor, or similar drive, universal serial bus (USB) flash drive, memory card, optical disc (e.g., compact disc (CD) or digital versatile disc (DVD)), floppy disk, magnetic tape, or other memory component.

In various embodiments, the memory 604 may include both volatile and nonvolatile memory and data storage components. Volatile components are those that do not retain data values upon loss of power. Nonvolatile components are those that retain data upon a loss of power. Thus, the memory 604 may include, for example, a RAM, ROM, magnetic or other hard disk drive, solid-state, semiconductor, or similar drive, USB flash drive, memory card accessed via a memory card reader, floppy disk accessed via an associated floppy disk drive, optical disc accessed via an optical disc drive, magnetic tape accessed via an appropriate tape drive, and/or other memory component, or any combination thereof. In addition, the RAM may include, for example, a static random access memory (SRAM), dynamic random access memory (DRAM), or magnetic random access memory (MRAM), and/or other similar memory device. The ROM may include, for example, a programmable read-only memory (PROM), erasable programmable read-only memory (EPROM), electrically erasable programmable read-only memory (EEPROM), or other similar memory device.

Also, the processor 602 may represent multiple processors 602 and/or multiple processor cores and the memory 604 may represent multiple memories that operate in parallel, respectively, or in combination. Thus, the local interface 606 may be an appropriate network or bus that facilitates communication between any two of the multiple processors 602, between any processor 602 and any of the memories 604, or between any two of the memories 604, etc. The local interface 606 may include additional systems designed to coordinate this communication, including, for example, a load balancer that performs load balancing. The processor 602 may be of electrical or of some other available construction.

As discussed above, the adaptive topic logic 130 may be embodied, in part, by software or executable-code components for execution by general purpose hardware. Alternatively the same may be embodied in dedicated hardware or a combination of software, general, specific, and/or dedicated purpose hardware. If embodied in such hardware, each can be implemented as a circuit or state machine, for example, that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart or process diagrams of FIGS. 3A and 3B are representative of certain processes, functionality, and operations of embodiments discussed herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 602. The machine code may be converted from the source code, etc. Further, each block may represent, or be connected with, a circuit or a number of interconnected circuits to implement a certain logical function or process step.

Although the flowchart or process diagrams of FIGS. 3A and 3B illustrate a specific order, it is understood that the order may differ from that which is depicted. For example, an order of execution of two or more blocks may be scrambled relative to the order shown. Also, two or more blocks shown in succession in FIGS. 3A and 3B may be executed concurrently or with partial concurrence. Further, in some embodiments, one or more of the blocks shown in FIG. 3A or 3B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the adaptive topic logic 130 that are embodied, at least in part, by software or executable-code components, may be embodied or stored in any tangible or non-transitory computer-readable medium or device for execution by an instruction execution system such as a general purpose processor. In this sense, the logic may be embodied as, for example, software or executable-code components that can be fetched from the computer-readable medium and executed by the instruction execution system. Thus, the instruction execution system may be directed by execution of the instructions to perform certain processes such as those illustrated in FIGS. 3A and 3B. In the context of the present disclosure, a "computer-readable medium" can be any tangible medium that can contain, store, or maintain any logic, application, software, or executable-code component described herein for use by or in connection with an instruction execution system.

The computer-readable medium can include any physical media such as, for example, magnetic, optical, or semiconductor media. More specific examples of suitable computer-readable media include, but are not limited to, magnetic tapes, magnetic floppy diskettes, magnetic hard drives, memory cards, solid-state drives, USB flash drives, or optical discs. Also, the computer-readable medium may include a RAM including, for example, an SRAM, DRAM, or MRAM. In addition, the computer-readable medium may include a ROM, a PROM, an EPROM, an EEPROM, or other similar memory device.

Further, any logic or application(s) described herein, including the adaptive topic logic, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 110. Additionally, it is understood that terms such as "application," "service," "system," "engine," "module," and so on may be interchangeable and are not intended to be limiting.

Disjunctive language, such as the phrase "at least one of X, Y, or Z," unless specifically stated otherwise, is to be understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying a program stored thereon that, when executed by one or more computing devices, directs at least one of the one or more computing devices to perform a method comprising:
    establishing, with at least one of the one or more computing devices, a static web page marker associated with a marked web page identified by a user;

establishing, with at least one of the one or more computing devices, an adaptive topic and an associated adaptive topic marker with reference to a history of activity of the user, the adaptive topic marker comprising a hierarchical structure of a plurality of web page links for the adaptive topic;

monitoring, with at least one of the one or more computing devices, for a change in status associated with the adaptive topic based at least in part on a purchase history of the user on an electronic commerce platform;

updating, with at least one of the one or more computing devices, a query associated with the adaptive topic in response to the change in status to provide at least one updated web page link for the adaptive topic;

rearranging, with at least one of the one or more computing devices, the adaptive topic marker to include the at least one updated web page link among the hierarchical structure of the plurality of web page links based at least in part on a relevancy of the at least one updated web page link to the adaptive topic;

comparing, with at least one of the one or more computing devices, a relevancy of the adaptive topic with a reorganization threshold; and reorganizing, with at least one of the one or more computing devices, a location of the adaptive topic marker with respect to a location of the static web page marker in a navigation page for display on a client device based at least in part on whether the relevancy of the adaptive topic exceeds the reorganization threshold.

2. The non-transitory computer-readable medium of claim 1, wherein the method further comprises:
   compiling, with at least one of the one or more computing devices, a history of updates associated with the adaptive topic over time; and
   reverting, with at least one of the one or more computing devices, the adaptive topic marker to a prior state in time with reference to the history of updates in response to a request from the user.

3. The non-transitory computer-readable medium of claim 1, wherein monitoring for the change in status associated with the adaptive topic includes at least one of:
   tracking, with at least one of the one or more computing devices, access requests associated with the adaptive topic based at least in part on time of day;
   monitoring, with at least one of the one or more computing devices, for new content related to the adaptive topic;
   identifying, with at least one of the one or more computing devices, a change in the purchase history of the user;
   tracking, with at least one of the one or more computing devices, activity of an affiliated user related to the user;
   identifying, with at least one of the one or more computing devices, a change in geographic location of the user or a client device;
   identifying, with at least one of the one or more computing devices, a type of the client device; and
   identifying, with at least one of the one or more computing devices, web locations of ingress and egress associated with the adaptive topic.

4. A system, comprising:
a memory configured to store computer-readable instructions; and
at least one computing device configured, through execution of the computer-readable instructions, to:
   establish an adaptive topic marker with reference to a history of activity of a user, the adaptive topic marker comprising a hierarchical structure of a plurality of network locations for the adaptive topic;
   monitor for a change in status associated with the adaptive topic based at least in part on a purchase history of the user on an electronic commerce platform;
   update, in response to the change in status, a query associated with the adaptive topic to provide at least one updated network location associated with the adaptive topic;
   rearrange the adaptive topic marker to include the at least one updated network location among the hierarchical structure of the plurality of network locations based at least in part on a relevancy of the at least one updated network location to the adaptive topic;
   compare a relevancy of the adaptive topic with a reorganization threshold; and
   reorganize a location of the adaptive topic marker with respect to a location of a static marker in a navigation page for display on a client device based at least in part on whether the relevancy of the adaptive topic exceeds the reorganization threshold.

5. The system of claim 4, wherein the at least one computing device is further configured to reorganize the navigation page to replace a second adaptive topic marker with the adaptive topic marker based at least in part on whether the relevancy of the adaptive topic exceeds the reorganization threshold.

6. The system of claim 5, wherein at least one of the relevancy of the adaptive topic or the reorganization threshold varies based at least in part on a time of day.

7. The system of claim 5, wherein the at least one computing device is further configured to reorganize the navigation page to include the adaptive topic marker in an arrangement of a plurality of adaptive topic markers.

8. The system of claim 4, wherein the at least one computing device is further configured to:
   compile a history of updates associated with the adaptive topic over time; and
   revert the adaptive topic marker to a prior state in time with reference to the history of updates.

9. The system of claim 4, wherein the at least one computing device is further configured to:
   determine a home region of the user based at least in part on a history of locations;
   determine a change in location of the user when the user has moved at least a threshold geographic distance beyond the home region; and
   update the query associated with the adaptive topic in response to the change in location of the user.

10. The system of claim 4, wherein the at least one computing device is further configured to:
    monitor for new content related to the adaptive topic; and
    refresh the adaptive topic marker associated with the adaptive topic based at least in part on the new content.

11. The system of claim 4, wherein the at least one computing device is further configured to:
    identify a change in the purchase history of the user; and
    update the query associated with the adaptive topic in response to the change in the purchase history of the user.

12. The system of claim 4, wherein the at least one computing device is further configured to:
    track activity of an affiliated user related to the user; and update the query associated with the adaptive topic in response to the change in activity of the affiliated user related to the user.

13. The system of claim 12, wherein the affiliated user includes at least one of an individual having a similar purchase history, a similar geographic location, or a similar personal status as the user.

14. The system of claim 4, wherein at least one computing device is further configured to:
establish the adaptive topic with reference to a history of activity of a plurality of users; and
monitor for the change in status based at least in part on a plurality of activities of the plurality of users.

15. The system of claim 4, wherein the at least one computing device is further configured to send a notification to the user regarding a change to the adaptive topic or the adaptive topic marker.

16. A method, comprising:
establishing, with one or more computing devices, an adaptive topic marker with reference to a history of activity of a user, the adaptive topic marker comprising a hierarchical structure of a plurality of network locations for the adaptive topic;
monitoring, with at least one of the one or more computing devices, for a change in status associated with the adaptive topic;
updating, with at least one of the one or more computing devices, a query associated with the adaptive topic in response to the change in status of the adaptive topic to provide at least one updated network location associated with the adaptive topic;
refreshing, with at least one of the one or more computing devices, the adaptive topic marker based at least in part on a relevancy of the at least one updated network location to the adaptive topic;
comparing, with at least one of the one or more computing devices, a relevancy of the adaptive topic with a reorganization threshold; and
reorganizing, with at least one of the one or more computing devices, a location of the adaptive topic marker with respect to a location of a static marker in a navigation page for display on a client device based at least in part on whether the relevancy of the adaptive topic exceeds the reorganization threshold.

17. The method of claim 16, wherein the monitoring further comprises identifying a change in a purchase history of the user on an electronic commerce platform.

18. The method of claim 17, wherein the monitoring comprises at least one of:
tracking access requests associated with the adaptive topic based at least in part on time of day;
identifying web locations of ingress and egress associated with the adaptive topic;
tracking activity of an affiliated user related to the user;
identifying a change in geographic location of the user or a client device of the user; and
identifying a type of the client device.

19. The method of claim 16, further comprising reorganizing, with at least one of the one or more computing devices, the navigation page to replace a second adaptive topic maker with the adaptive topic marker based at least in part on whether the relevancy of the adaptive topic exceeds the reorganization threshold.

20. The method of claim 16, further comprising:
compiling, with at least one of the one or more computing devices, a history of updates associated with the adaptive topic over time; and
reverting, with at least one of the one or more computing devices, the adaptive topic marker to a prior state in time with reference to the history of updates.

21. The method of claim 16, further comprising:
determining, with at least one of the one or more computing devices, a home region of the user based at least in part on the history of activity;
determining, with at least one of the one or more computing devices, a change in location of the user; and
updating, with at least one of the one or more computing devices, the query associated with the adaptive topic in response to the change in location of the user.

22. The method of claim 16, further comprising:
identifying, with at least one of the one or more computing devices, a change in purchase history of the user; and
updating, with at least one of the one or more computing devices, the query associated with the adaptive topic in response to the change in purchase history of the user.

* * * * *